US012008746B2

(12) United States Patent
Takada

(10) Patent No.: US 12,008,746 B2
(45) Date of Patent: Jun. 11, 2024

(54) DETERMINING CONDITION OF CONVEYOR BELT BY CALCULATING APPARENT VELOCITIES FROM CAPTURED IMAGES OF CONVEYOR BELT

(71) Applicant: NEC Corporation, Tokyo (JP)

(72) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 416 days.

(21) Appl. No.: 17/296,792

(22) PCT Filed: Dec. 6, 2018

(86) PCT No.: PCT/JP2018/045000
§ 371 (c)(1),
(2) Date: May 25, 2021

(87) PCT Pub. No.: WO2020/115884
PCT Pub. Date: Jun. 11, 2020

(65) Prior Publication Data
US 2022/0012869 A1 Jan. 13, 2022

(51) Int. Cl.
*G06T 7/00* (2017.01)
*B65G 43/02* (2006.01)
*B65G 43/08* (2006.01)

(52) U.S. Cl.
CPC ............ *G06T 7/0004* (2013.01); *B65G 43/02* (2013.01); *B65G 43/08* (2013.01); *B65G 2203/0275* (2013.01); *B65G 2203/0291* (2013.01); *B65G 2203/041* (2013.01); *B65G 2203/042* (2013.01); *G06T 2207/30108* (2013.01)

(58) Field of Classification Search
CPC ........ G06T 7/0004; G06T 2207/30108; B65G 43/02; B65G 43/08; B65G 2203/0275; B65G 2203/0291; B65G 2203/041; B65G 2203/044; B65G 2203/042; G01N 21/84; G01N 21/8914; G01N 2021/8411
See application file for complete search history.

(56) References Cited

U.S. PATENT DOCUMENTS 6,118,132 A * 9/2000 Tullis ..................... G01B 11/16
33/732
7,423,737 B2 * 9/2008 Saxena ..................... G01P 3/36
356/28

(Continued)

FOREIGN PATENT DOCUMENTS

JP H0912128 A 1/1997
JP 2012071988 A 4/2012

(Continued)

OTHER PUBLICATIONS

International Search Report of PCT Application No. PCT/JP2018/045000 dated Feb. 26, 2019.

*Primary Examiner* — Michael P LaPage
(74) *Attorney, Agent, or Firm* — Sughrue Mion, PLLC

(57) ABSTRACT

An inspection device includes an acquisition unit that acquires a plurality of images, captured from a given height, of an inspection object controlled to move at a constant velocity, a comparison unit that compares movements of the inspection object in the images on the basis of the plurality of images, and a determination unit that determines the condition of the inspection object on the basis of a comparison result.

7 Claims, 14 Drawing Sheets

(56) References Cited

U.S. PATENT DOCUMENTS

| | | | |
|---|---|---|---|
| 10,812,778 B1* | 10/2020 | Wang | G01B 11/0608 |
| 2003/0168317 A1 | 9/2003 | Fromme et al. | |
| 2006/0008170 A1* | 1/2006 | Beausoleil | G06T 5/003 |
| | | | 382/254 |
| 2011/0063459 A1* | 3/2011 | McGarry | H04N 25/771 |
| | | | 348/208.4 |
| 2011/0116073 A1* | 5/2011 | Bergmann | G01P 3/36 |
| | | | 356/28 |
| 2011/0141269 A1* | 6/2011 | Varga | G01N 21/8903 |
| | | | 348/92 |
| 2012/0048682 A1 | 3/2012 | Itoh et al. | |
| 2013/0020392 A1* | 1/2013 | Olmstead | G07G 1/0063 |
| | | | 235/440 |
| 2013/0321657 A1* | 12/2013 | McGarry | H04N 25/771 |
| | | | 348/208.4 |
| 2014/0198146 A1* | 7/2014 | Shin | B41J 2/2135 |
| | | | 347/14 |
| 2014/0328463 A1* | 11/2014 | Lughausen | G01N 23/04 |
| | | | 378/62 |
| 2015/0030125 A1* | 1/2015 | Pfander | G01N 23/04 |
| | | | 378/57 |
| 2018/0106601 A1* | 4/2018 | Eisen | B65H 23/0216 |
| 2018/0370023 A1* | 12/2018 | Ooba | B25J 15/0095 |
| 2019/0042847 A1* | 2/2019 | Suzuki | G06V 20/63 |
| 2019/0164276 A1* | 5/2019 | Huotilainen | G01N 21/8903 |
| 2019/0392575 A1* | 12/2019 | Huotilainen | G01N 21/8983 |
| 2020/0034756 A1 | 1/2020 | Hou | |

FOREIGN PATENT DOCUMENTS

| | | |
|---|---|---|
| JP | 2015199568 A | 11/2015 |
| JP | 2018144969 A | 9/2018 |
| JP | 2018181016 A | 11/2018 |

* cited by examiner

Fig.5

| IMAGE ID | IMAGE |
|---|---|
| 1 | G1 |
| 2 | G2 |
| 3 | G3 |
| ⋮ | ⋮ |
| n | Gn |

Fig.6

| IDENTIFICATION INFORMATION | APPARENT VELOCITY |
|---|---|
| 1 | s1 |
| 2 | s2 |
| 3 | s3 |
| ⋮ | ⋮ |
| m | sm |

CONVEYOR BELT INSPECTION SYSTEM 100

Fig.13
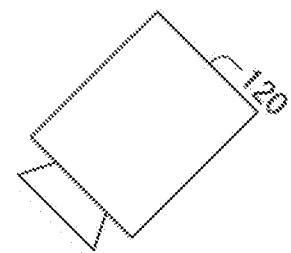
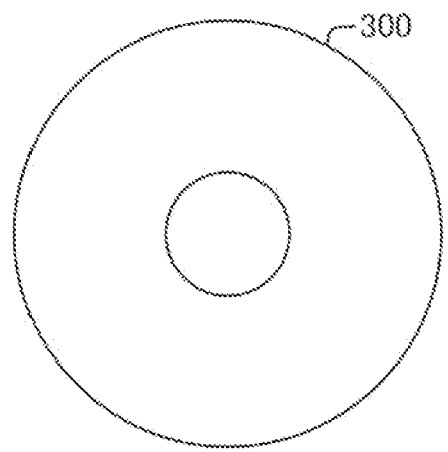

DETERMINING CONDITION OF CONVEYOR BELT BY CALCULATING APPARENT VELOCITIES FROM CAPTURED IMAGES OF CONVEYOR BELT

This application is a National Stage Entry of PCT/JP2018/045000 filed on Dec. 6, 2018, the contents of all of which are incorporated herein by reference, in their entirety.

TECHNICAL FIELD

The present invention relates to an inspection device, an inspection method, and a storage medium.

BACKGROUND ART

A device for inspecting the condition of an inspection object that is a device controlled to operate at a constant velocity has been known.

For example, Patent Literature 1 describes a belt flaw detection device that inspects the condition of a conveyor belt that is an example of an inspection object, such as a flaw or the like on the conveyor belt. According to Patent Literature 1, the belt flaw detection device uses a plurality of distance sensors placed side by side in the belt width direction to measure the distance from each sensor to the belt. Then, the belt flaw detection device performs flaw detection and longitudinal tear generation time prediction in accordance with the measured result.

Patent Literature 1: JP 9-12128 A

SUMMARY

As described in Patent Literature 1, the condition of an inspection object may be inspected with use of a distance sensor by measuring the distance to the inspection object. However, a distance sensor that can be used for precise measurement is very expensive. Therefore, a method using a distance sensor as described in Patent Literature 1 causes a problem of high cost.

In view of the above, an object of the present invention is to provide an inspection device, an inspection method, and a storage medium that can solve the problem of high cost in inspecting an inspection object.

In order to achieve the object, an inspection device according to one aspect of the present invention is configured to include an acquisition unit that acquires a plurality of images, captured from a given height, of an inspection object controlled to move at a constant velocity, a comparison unit that compares, on the basis of the plurality of images, movements of the inspection object in the images; and a determination unit that determines the condition of the inspection object on the basis of a comparison result.

Further, an inspection method that is another aspect of the present invention is configured to include, by an inspection device, acquiring a plurality of images, captured from a given height, of an inspection object controlled to move at a constant velocity, on the basis of the plurality of images, comparing movements of the inspection object in the images; and determining the condition of the inspection object on the basis of a comparison result.

Further, a storage medium that is another aspect of the present invention is a computer-readable medium storing a program for implementing, on an inspection device, an acquisition unit that acquires a plurality of images, captured from a given height, of an inspection object controlled to move at a constant velocity, a comparison unit that compares, on the basis of the plurality of images, movements of the inspection object in the images; and a determination unit that determines the condition of the inspection object on the basis of a comparison result.

With the configuration described above, the present invention is able to provide an inspection device, an inspection method, and a storage medium that enable suppression of the cost of inspecting an inspection object.

BRIEF DESCRIPTION OF DRAWINGS

Figure 5:
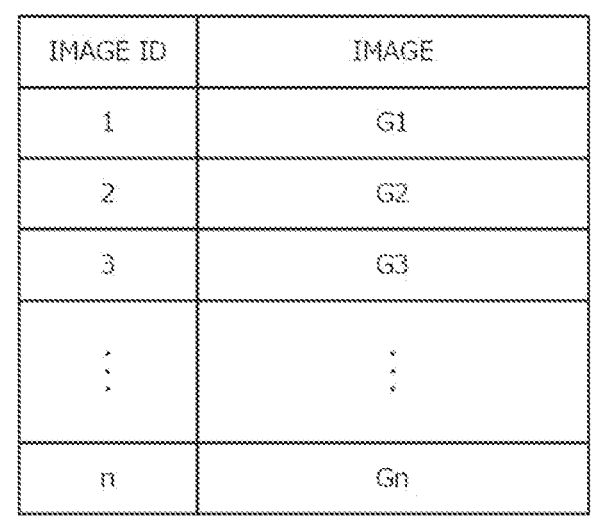

FIG. 5 illustrates an example of the image data illustrated in FIG. 4.

FIG. 6 illustrates an example of the apparent velocity information illustrated in FIG. 4.

FIG. 13 illustrates an example of another method of calculating the apparent velocity.

EXEMPLARY EMBODIMENTS

First Exemplary Embodiment

Figure 1:
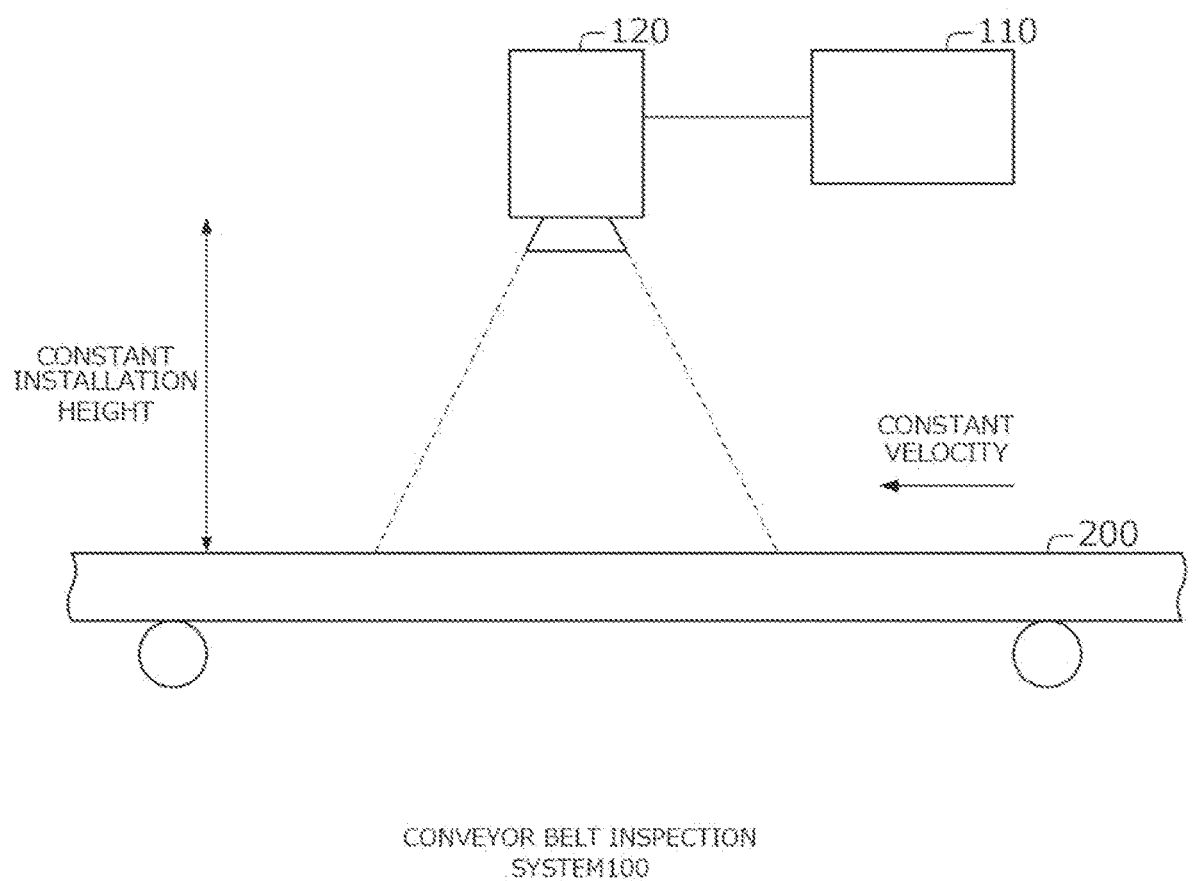
FIG. 1 is a diagram illustrating an exemplary configuration of a conveyor belt inspection system according to a first exemplary embodiment of the present invention.
Figure 2:
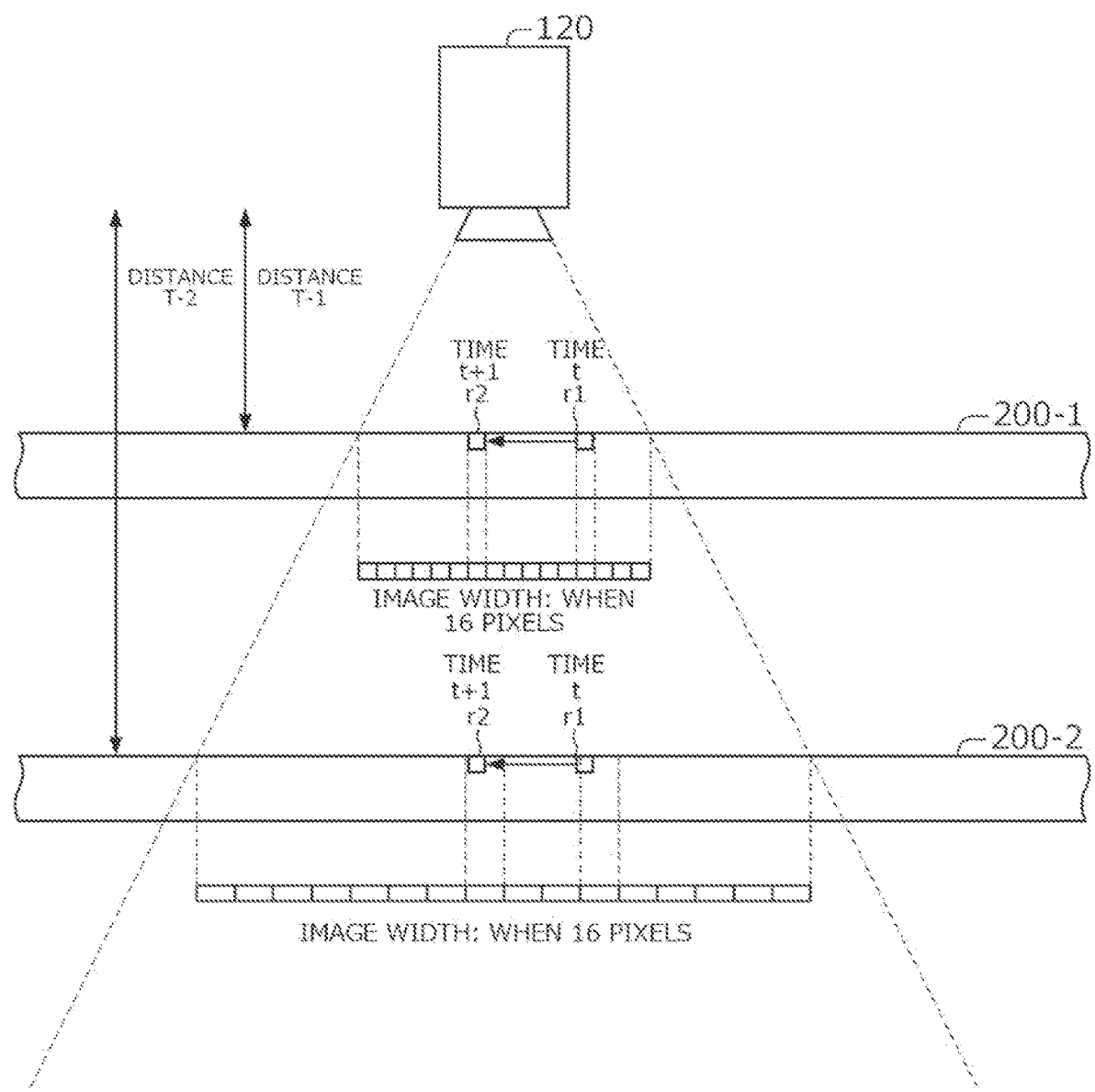
FIG. 2 is a schematic diagram for explaining the principle of conveyor belt inspection described in the first exemplary embodiment of the present invention.
Figure 3:
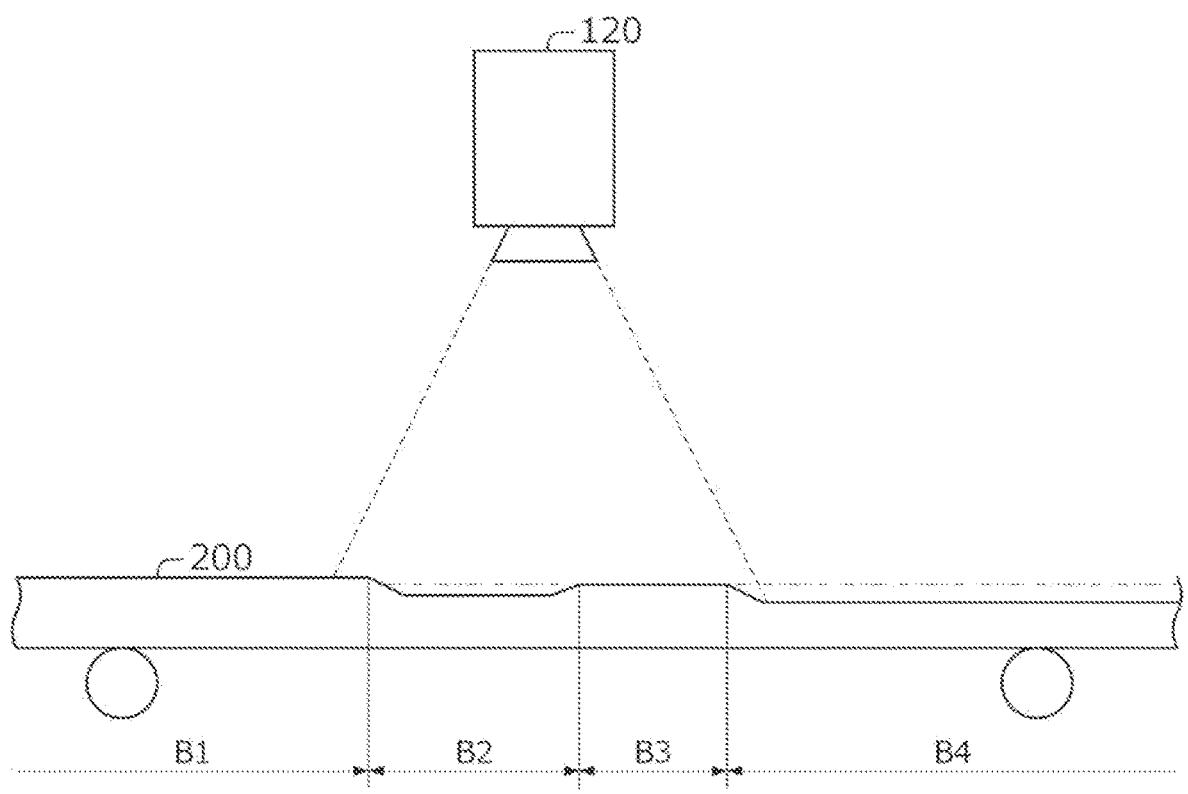
FIG. 3 is a schematic diagram for explaining the principle of conveyor belt inspection described in the first exemplary embodiment of the present invention.
Figure 4:
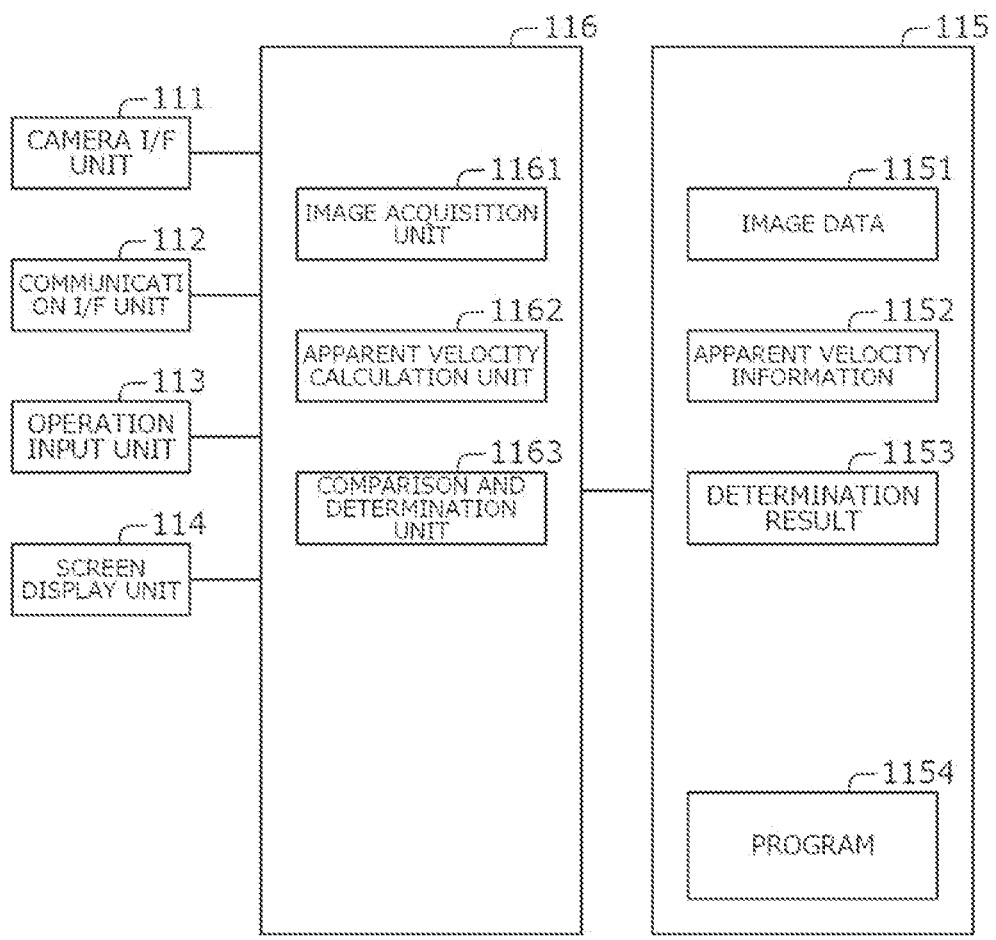
FIG. 4 is a block diagram illustrating an exemplary configuration of the conveyor belt inspection device illustrated in FIG. 1.
Figure 7:
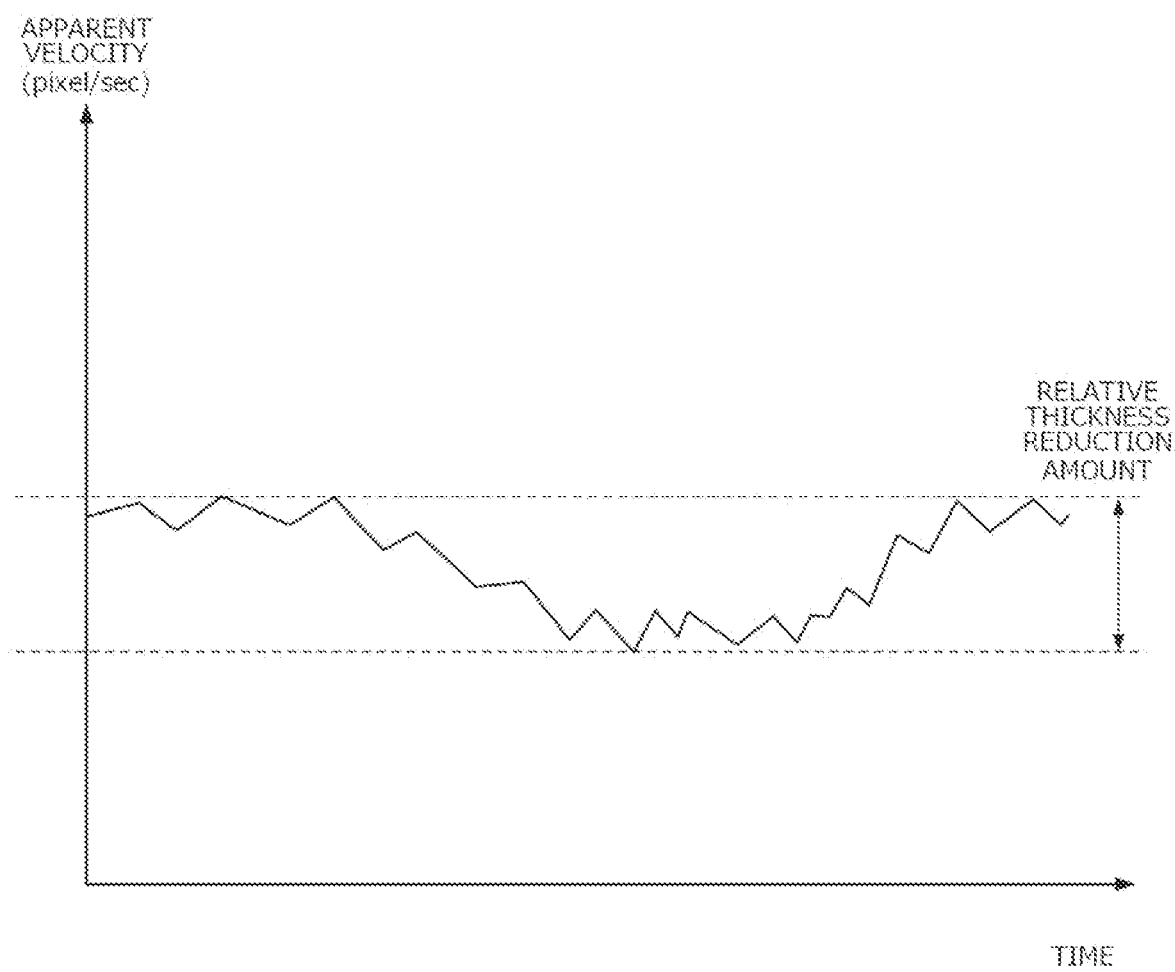
FIG. 7 is a line graph showing an exemplary relationship between the apparent velocity and time.
Figure 8:
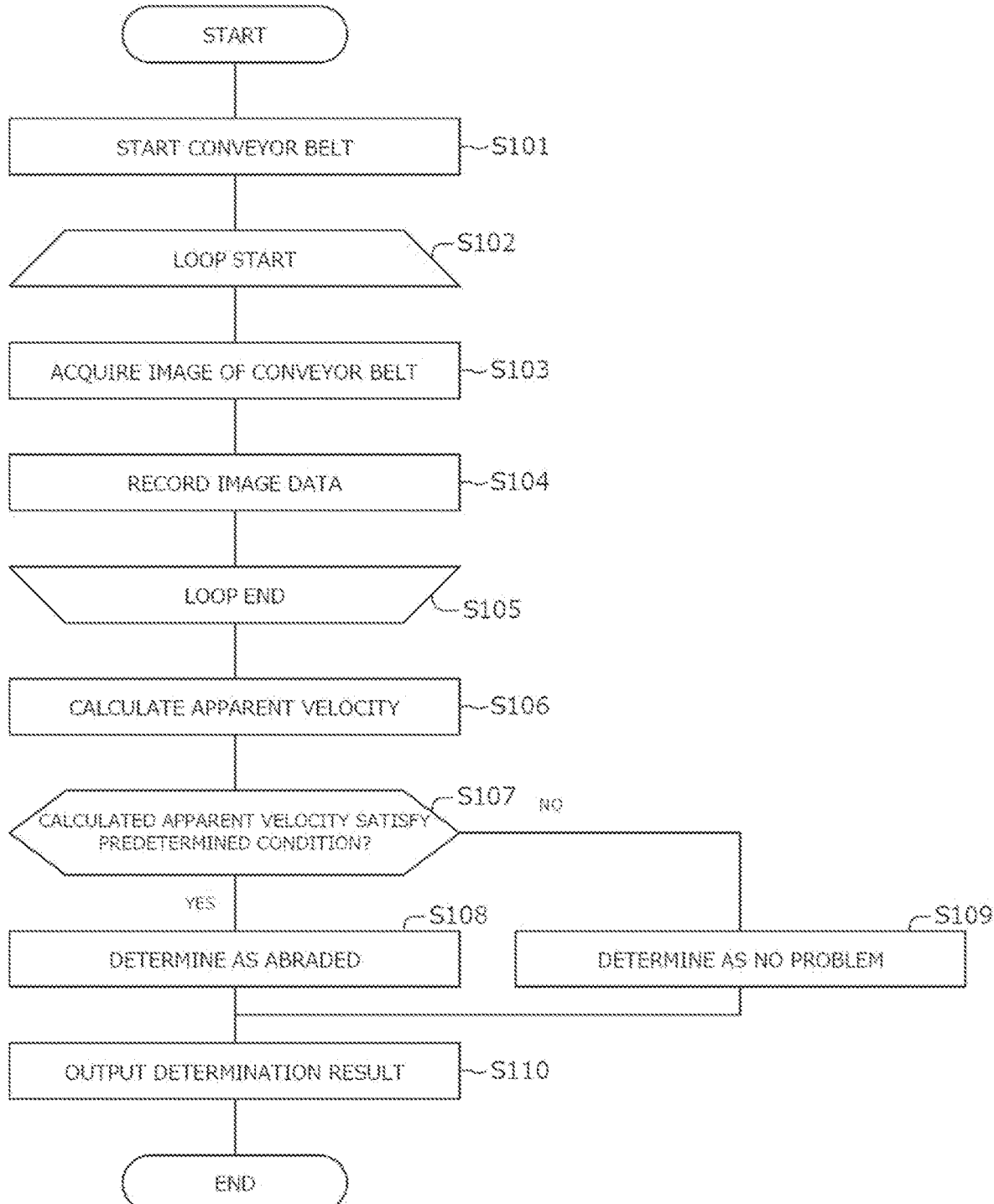
FIG. 8 is a flowchart showing an exemplary operation of the conveyor belt inspection device.
Figure 9:
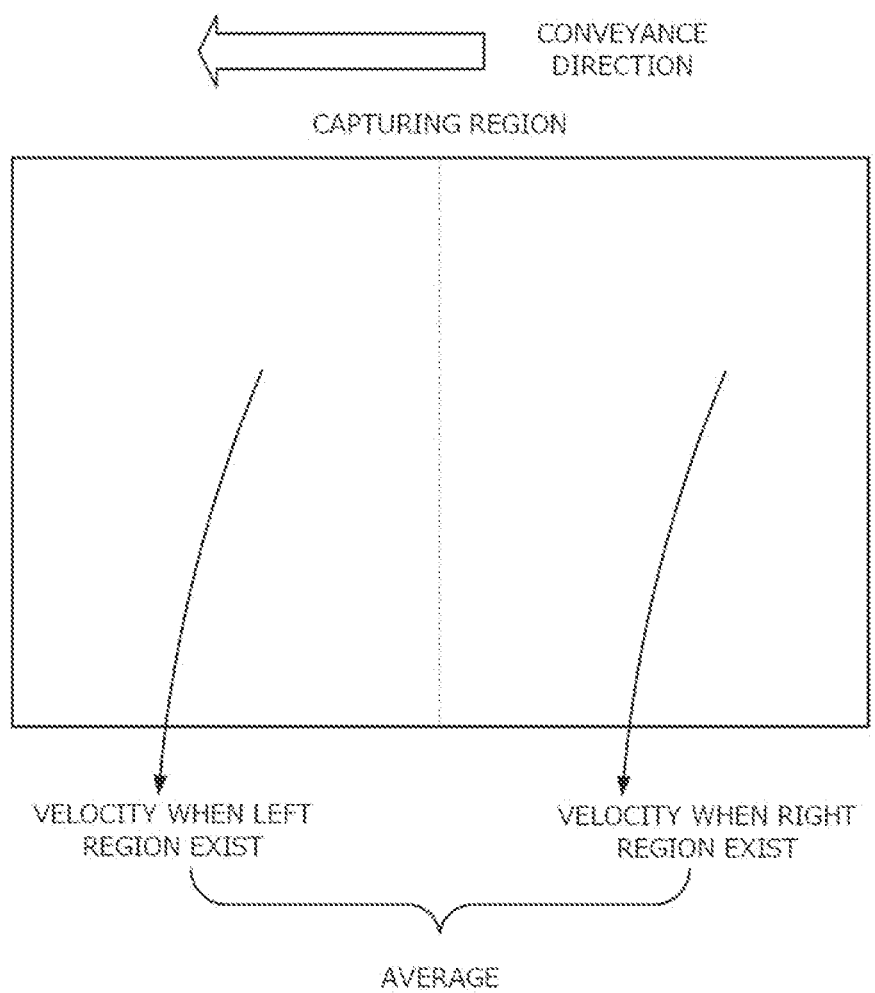
FIG. 9 is a diagram illustrating another exemplary configuration of a conveyor belt inspection device.
Figure 10:
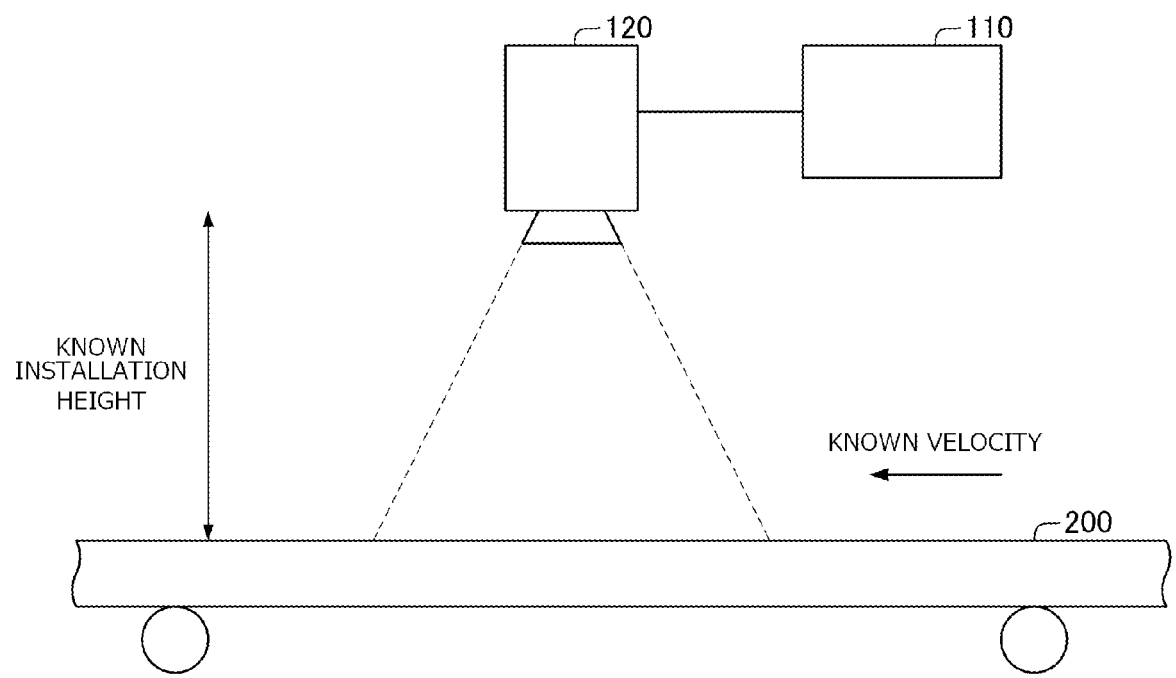
FIG. 10 is a diagram for explaining the absolute thickness reduction amount in the other exemplary configuration.
Figure 11:
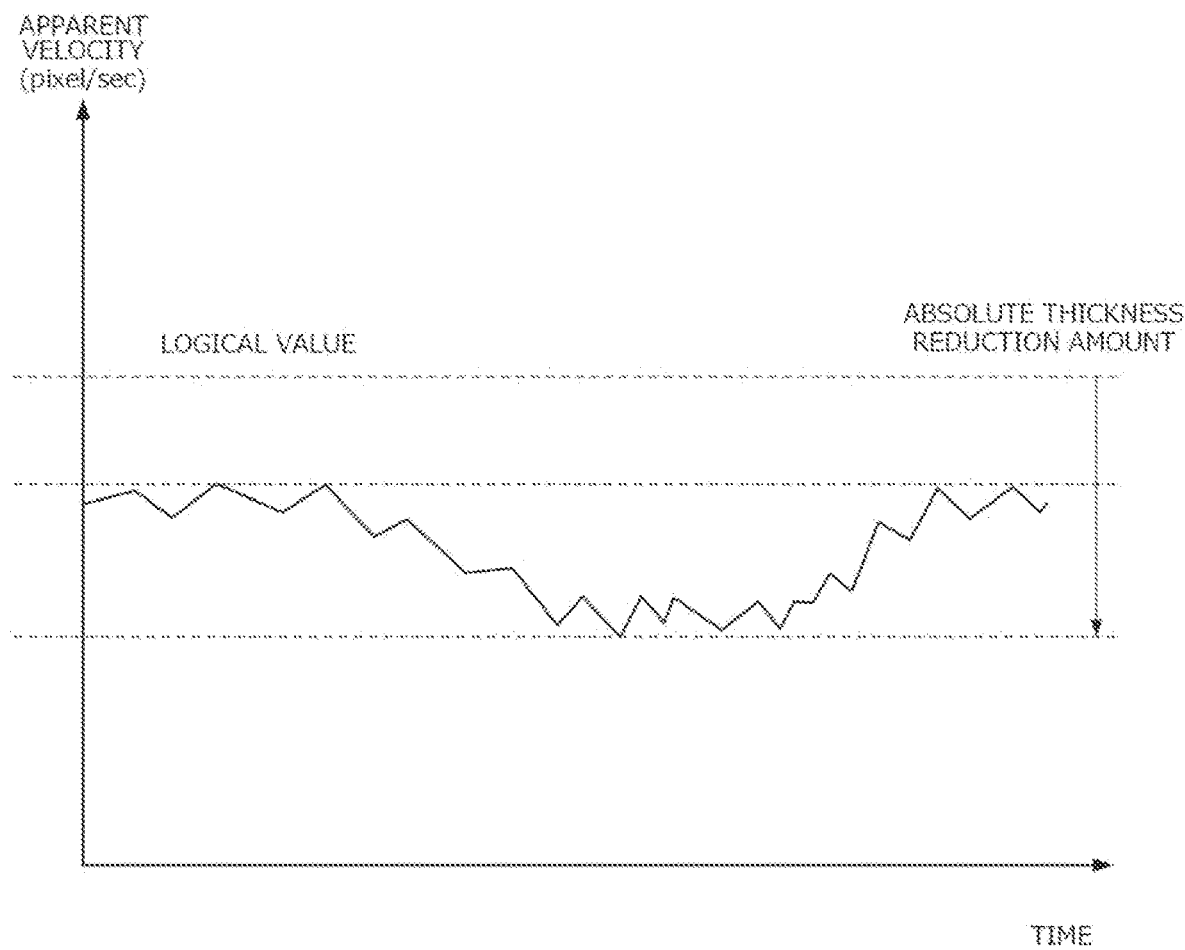
FIG. 11 is a diagram illustrating an example of another inspection object.
Figure 12:
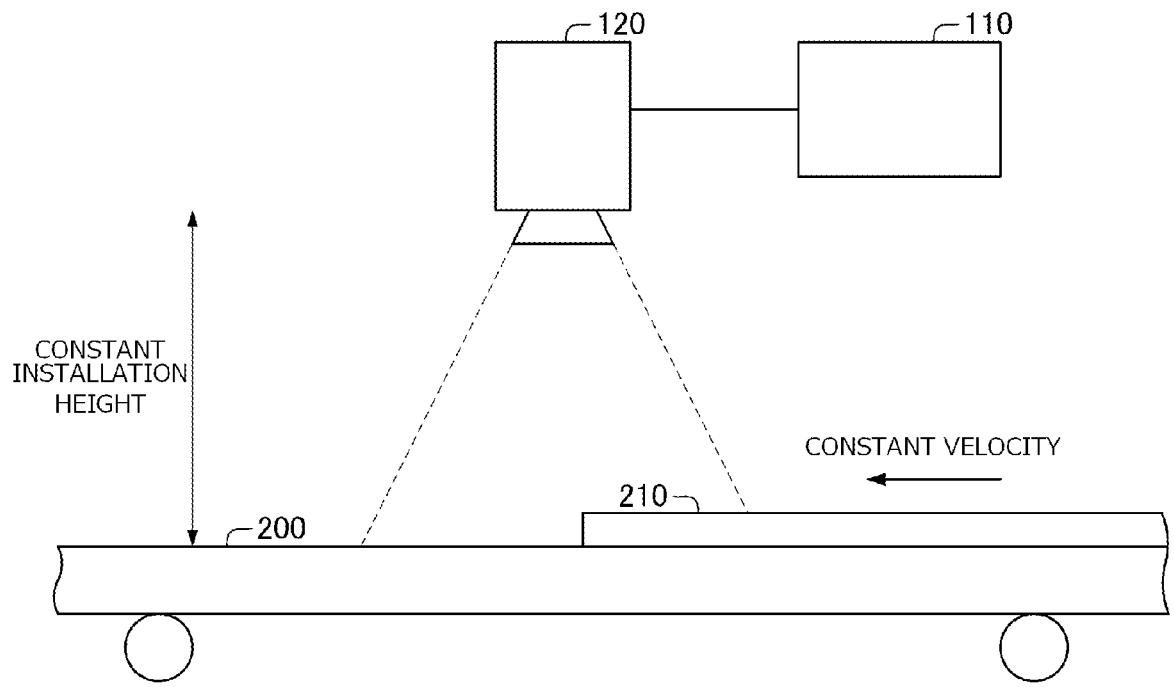
FIG. 12 is a diagram illustrating an example of another inspection object.

A first exemplary embodiment of the present invention will be described with reference to FIGS. 1 to 13. FIG. 1 is a diagram illustrating an exemplary configuration of a conveyor belt inspection system 100. FIGS. 2 and 3 are diagrams explaining the principle of conveyor belt inspection performed by the conveyor belt inspection system 100. FIG. 4 is a block diagram illustrating an exemplary configuration of a conveyor belt inspection device 110. FIG. 5 illustrates an example of image data 1151. FIG. 6 illustrates an example of apparent velocity information 1152. FIG. 7 is a line graph showing an exemplary relationship between the apparent velocity and time. FIG. 8 is a flowchart showing an exemplary operation of the conveyor belt inspection device. FIG. 9 is a diagram illustrating another exemplary configuration of a conveyor belt inspection device. FIG. 10 is a diagram for explaining the absolute thickness reduction amount in the other exemplary configuration illustrated in FIG. 9. FIGS. 11 and 12 are diagrams illustrating examples of other inspection objects. FIG. 13 illustrates an example of another method of calculating the apparent velocity.

A first exemplary embodiment of the present invention describes the conveyor belt inspection system 100 that determines the condition of a conveyor belt 200 that is an example of an inspection object. In the conveyor belt inspection system 100 of the present embodiment, a surface of the conveyor belt 200 that is controlled to operate at a constant velocity is photographed using a camera 120 installed in advance, whereby a plurality of image data units, captured at different clock times, are acquired. As described below, the conveyor belt inspection device 110 uses the acquired image data units to determine the apparent moving amount in a predetermined region between the image data units. Then, on the basis of the determined apparent moving amount, the conveyor belt inspection device 110 calculates the apparent velocity that is the apparent moving velocity of the conveyor belt 200 that can be determined from the image data units. Then, the conveyor belt inspection device 110 determines the condition of the conveyor belt 200 on the basis of the calculated apparent velocity.

Note that the apparent moving amount means a moving amount that can be determined only from the image data, such as how many pixels a predetermined region has moved, for example. Since it is the apparent moving amount, even if the apparent moving amounts are the same, there is a case where the objective moving amounts are different (for example, how many mm it has actually moved). Moreover, the apparent velocity means the velocity that is apparently calculated based on the apparent moving amount.

FIG. 1 illustrates an example of the overall configuration of the conveyor belt inspection system 100. Referring to FIG. 1, the conveyor belt inspection system 100 includes the conveyor belt inspection device 110 and the camera 120.

As illustrated in FIG. 1, the conveyor belt inspection device 110 and the camera 120 are connected to each other via a cable or the like so as to be communicable with each other. The camera 120 is installed in advance in a state of being oriented downward such that the height thereof from the conveyor belt 200 becomes constant. For example, the camera 120 is installed immediately above the conveyor belt 200 in such a manner that the installation height that is the distance between the camera 120 and the conveyor belt 200 becomes about 1.5 m. Thereby, for example, the camera 120 captures images of the conveyor belt 200 moving at a constant velocity from immediately above the conveyor belt 200.

Note that in the conveyor belt inspection system 100 described in the present embodiment, it is not necessary to strictly determine the installation height of the camera 120. Therefore, the camera 120 may not be installed to have an installation height of 1.5 m strictly. Moreover, it is not necessary that the moving velocity of the conveyor belt 200 is known, if it is constant.

Here, the principle of conveyor belt inspection performed in the conveyor belt inspection system 100 will be described with use of FIGS. 2 and 3. FIGS. 2 and 3 are schematic diagrams for explaining the principle of conveyor belt inspection. FIG. 2 illustrates the cases where the distances between the camera 120 and the conveyor belt 200 are different, and FIG. 3 illustrates the case where abrasion is caused in the conveyor belt 200 so that the thickness thereof is reduced in some parts.

As illustrated in FIG. 2, when the velocity of the conveyor belt 200 is constant, as the distance between the camera 120 and the conveyor belt 200 is shorter, it appears that the conveyor belt largely moves in the capturing region. This means that the apparent moving amount is larger. For example, it is assumed that a region r on the conveyor belt 200 moves from r1 to r2 between image data captured at time t and image data captured at time t+1. It is also assumed that the moving velocity of a conveyor belt 200-1 and the moving velocity of a conveyor belt 200-2 are the same and constant. In that case, as illustrated in FIG. 2, it appears that the moving amount is larger on the image data in the case of capturing the conveyor belt 200-1 located at a shorter distance (distance T-1), compared with the case of capturing the conveyor belt 200-2 located at a longer distance (distance T-2). This means that the apparent moving amount (for example, the number of pixels) moved from time t to time t+1 is larger in the case of capturing the conveyor belt 200-1, compared with the case of capturing the conveyor belt 200-2. Specifically, for example, assuming that the width of an image has 16 pixels as illustrated in FIG. 2, in the case of capturing the conveyor belt 200-1 located at the distance T-1, the region r has moved about 6 pixels. On the other hand, in the case of capturing the conveyor belt 200-2 located at the distance T-2, the region r has moved about 3 pixels.

Accordingly, when the apparent velocity is calculated based on the apparent moving amount by dividing the number of pixels, moved in a period from time t to time t+1, by the moving time period ((time t+1)−time t), the velocity is faster in the case of capturing the conveyor belt 200-1 compared with the case of capturing the conveyor belt 200-2. This means that by calculating the apparent velocities and comparing the calculated apparent velocities, it is possible to determine that the distance between the camera 120 and the conveyor belt 200 is shorter or longer. That is, by calculating the apparent velocities and comparing them, it is possible to determine whether the distance between the camera 120 and the conveyor belt 200 has become shorter or longer.

FIG. 3 illustrates the case of applying the principle described above to inspection of the actual conveyor belt 200. As illustrated in FIG. 3, in the actual conveyor belt 200, the thickness of the belt becomes thinner due to abrasion. As a result of the thickness of the belt becoming thinner, the distance between the camera 120 and the conveyor belt 200 becomes longer. For example, in the case illustrated in FIG. 3, the distance between the camera 120 and the conveyor belt 200 becomes longer in the order of ranges B1, B3, B2, and B4 in the conveyor belt 200.

In the conveyor belt inspection described in the present embodiment, by calculating the apparent velocity, it is determined whether or not the distance between the camera 120 and the conveyor belt 200 has become longer. That is, when the apparent velocities that are the moving amounts of the conveyor belt 200 per unit time are different, it is determined that the conveyor belt 200 is deteriorated and the thickness is thinner. Therefore, the condition of the conveyor belt 200 (thickness abrasion) is determined on the basis of the apparent velocity. As described above, by performing determination on the basis of the result of comparing apparent velocities, it is possible to determine the condition of the conveyor belt 200 such as whether the thickness is reduced by abrasion, without precisely measuring the distance between the camera 120 and the conveyor belt 200.

When actual inspection is performed, it is assumed that the width of an image has about 4000 pixels, for example. However, the number of pixels may be different from that mentioned as an example. Further, it is also assumed that the region r does not simply move laterally, due to the fact that the camera 120 is obliquely oriented or the like. In that case, the apparent moving distance may be calculated by using a trigonometric function, for example.

In the conveyor belt inspection system 100 described in the present embodiment, the condition of the conveyor belt 200 is determined using the principle as described above. Hereinafter, each of the components included in the conveyor belt inspection system 100 will be described in more detail.

The conveyor belt inspection device 110 is an information processing device that determines the condition of the conveyor belt 200 on the basis of images of the conveyor belt 200 captured by the camera 120. For example, the conveyor belt inspection device 110 fetches images of the conveyor belt 200 captured by the camera 120. Then, the conveyor belt inspection device 110 performs predetermined processing on the basis of the fetched images and determines the condition of the conveyor belt 200 Then, the conveyor belt inspection device 110 outputs the determined result.

FIG. 4 is a diagram illustrating an exemplary configuration of the conveyor belt inspection device 110. Referring to FIG. 4, the conveyor belt inspection device 110 includes, for example, a camera interface (I/F) unit 111, a communication I/F unit 112, an operation input unit 113, a screen display unit 114, a storage unit 115, and an arithmetic processing unit 116.

The camera I/F unit 111 is connected to the camera 120 via a cable or the like. The camera I/F unit 111 performs transmission and reception of data between the camera 120 and the arithmetic processing unit 116.

The communication I/F unit 112 is configured of a data communication circuit. The communication I/F unit 112 performs data communication with an external device, not shown, connected via wired or wireless communication.

The operation input unit 113 is configured of operation input devices such as a keyboard and a mouse. The operation input unit 113 detects operation by an operator who operates the conveyor belt inspection device 110 and outputs it to the arithmetic processing unit 116, for example.

The screen display unit 114 is a screen display device such as a liquid crystal display (LCD). For example, the screen display unit 114 displays, on the screen, various types of information such as a result of determination shown by a determination result 1153, in response to an instruction from the arithmetic processing unit 116.

The storage unit 115 is configured to storage device such as a hard disk and a memory. The storage unit 115 stores processing information required for various types of processing in the arithmetic processing unit 116 and a program 1154. The program 1154 is read and executed by the arithmetic processing unit 116 to thereby implement various processing units. The program 1154 is read in advance from an external device or a storage medium, not shown, via the data input/output function of the communication I/F unit 112 or the like, and is stored in the storage unit 115. The main processing information stored in the storage unit 115 includes image data 1151, apparent velocity information 1152, and the determination result 1153, for example.

The image data 1151 is image data of the conveyor belt 200 captured by the camera 120. FIG. 5 illustrates examples of the image data 1151. Referring to FIG. 5, in the image data 1151, an image ID and image data are associated with each other, for example. Here, an image ID is identification information of image data, which is captured time of the image or the frame number, for example.

In the case of the present embodiment, image data when the conveyor belt 200 is driven for one revolution at a constant velocity, is captured. That is, the image data 1151 includes image data acquired by the camera 120 when the conveyor belt 200 is driven for one revolution at a constant velocity. Of course, the image data 1151 may include image data besides those illustrated above.

The apparent velocity information 1152 includes a value showing the apparent velocity calculated by the apparent velocity calculation unit 1162. FIG. 6 illustrates an example of the apparent velocity information 1152. Referring to FIG. 6, in the apparent velocity information 1152, identification information and the apparent velocity are associated with each other. The identification information may be time information or information representing the period of time after the conveyor belt 200 started to move, for example. The apparent velocity means, for example, apparent velocity of the conveyor belt 200 calculated based on the image data 1151. For example, the apparent velocity is a value showing the amount of change in the number of pixels per unit time.

The determination result 1153 shows the condition of the conveyor belt 200 determined based on the apparent velocity information 1152 by the comparison and determination unit 1163. The determination result 1153 may include various conditions of the conveyor belt 200 such as abrasion being caused, no problem, replacement being needed, and the like, for example.

The arithmetic processing unit 116 includes a processor such as MPU and the peripheral circuits. The arithmetic processing unit 116 reads and executes the program 1154 from the storage unit 115 to implement the various processing units by the cooperation of the hardware and the program 1154. The main processing units implemented by the arithmetic processing unit 116 include the image acquisition unit 1161 (acquisition unit), the apparent velocity calculation unit 1162, and the comparison and determination unit 1163 (comparison unit, determination unit), for example.

The image acquisition unit 1161 acquires a plurality of image data units from the camera 120 by transmitting commands via the camera I/F unit 111. Then, the image acquisition unit 1161 stores the acquired image data in the storage unit 115 as the image data 1151.

For example, the image acquisition unit 1161 acquires, from the camera 120, image data acquired by the camera 120 at a predetermined frame rate during the time that the conveyor belt 200 is driven for one revolution at a constant velocity. That is, the image acquisition unit 1161 at least acquires image data for one loop of the conveyor belt 200 in a state where there is no conveyed article.

The apparent velocity calculation unit 1162 reads the image data 1151 from the storage unit 115, performs predetermined image processing to calculate the apparent velocity, and stores the calculated apparent velocity in the storage unit 115 as the apparent velocity information 1152.

For example, the apparent velocity calculation unit 1162 acquires image data units of the successive acquisition clock times (successive image IDs) among the image data units recorded as the image data 1151. Then, the apparent velocity calculation unit 1162 extracts feature amounts from the acquired image data units for example, to thereby extract the same extraction points such as flaws, patterns, and dirt. Then, the apparent velocity calculation unit 1162 compares the extracted extractions points to thereby determine how many pixels the same extraction points such as flaws, patterns, or dirt have moved between the acquired image data units. This means that the apparent velocity calculation unit 1162 determines the apparent moving amount of the extraction points between the image data units. Thereafter, the determined number of pixels are divided by the time period between the image data units. In this way, by dividing the number of pixels in which the extraction points have moved by the time period taken for the movement for example, the apparent velocity calculation unit 1162 calculates the apparent velocity that is a value indicating the amount of change in the number of pixels per unit time. Thereafter, the apparent velocity calculation unit 1162 stores the calculated apparent velocity in the storage unit 115 as the apparent velocity information 1152.

For example, the apparent velocity calculation unit 1162 repeatedly performs the processing described above between the image data units of the successive acquisition clock times. Consequently, as illustrated in FIG. 7, in the apparent velocity information 1152, apparent velocities corresponding to the time (clock time) are accumulated.

Note that the apparent velocity calculation unit 1162 may calculate the apparent velocity by a method other than that illustrated above, if the apparent velocity can be calculated. For example, the apparent velocity calculation unit 1162 may calculate the apparent velocity by a method other than the method of calculating the apparent velocity from image data units of the successive acquisition clock times, such as a method of calculating the apparent velocity on the basis of the time period from the time when an extraction point appears in the captured region until it moves out of the capturing region.

Moreover, the apparent velocity calculation unit 1162 may be configured to calculate the apparent velocity in sub-pixel precision in a predetermined small region unit by using a digital image correlation method, a phase limitation correlation method, an optical flow, or the like. As described above, the apparent velocity calculation unit 1162 may calculate the apparent velocity by using a well-known method other than that described in the present embodiment, if it is possible to calculate the apparent velocity corresponding to the apparent moving amount.

The comparison and determination unit 1163 determines the condition of the conveyor belt 200 on the basis of the apparent velocity information 1152. For example, the comparison and determination unit 1163 compares apparent velocities included in the apparent velocity information 1152. Then, the comparison and determination unit 1163 extracts the highest apparent velocity and the lowest apparent velocity from among the apparent velocities included in the apparent velocity information 1152, and obtains the difference between the highest apparent velocity and the lowest apparent velocity. Thereby, the comparison and determination unit 1163 acquires a value representing the relative thickness reduction amount (see FIG. 7). Then, the comparison and determination unit 1163 determines whether the value representing the relative thickness reduction amount is equal to or larger than a predetermined threshold.

When the value representing the relative thickness reduction amount is equal to or larger than the predetermined threshold, the comparison and determination unit 1163 determines that the conveyor belt 200 is abraded. Then, the comparison and determination unit 1163 outputs the determination result that the conveyor belt 200 is abraded, to the screen display unit 114 or an external device or the like connected via the communication I/F unit 112. Moreover, the comparison and determination unit 1163 stores the determined result in the storage unit 115 as the determination result 1153. Meanwhile, when the value representing the relative thickness reduction amount is smaller than the predetermined threshold, the comparison and determination unit 1163 determines that there is no problem, for example. Then, the comparison and determination unit 1163 outputs the determination result indicating that there is no problem, to the screen display unit 114 or an external device or the like connected via the communication I/F unit 112. Further, the comparison and determination unit 1163 stores the determined result in the storage unit 115 as the determination result 1153.

As described above, the comparison and determination unit 1163 compares the apparent velocities with each other, and determines the condition of the conveyor belt 200 on the basis of the difference between the apparent velocities. Then, the comparison and determination unit 1163 stores the determined result in the storage unit 115.

Note that the comparison and determination unit 1163 may be configured to perform determination step by step such as abrasion being caused, no problem, replacement being needed, and the like, on the basis of a plurality of predetermined thresholds.

Moreover, the information output by the comparison and determination unit 1163 is not limited to those illustrated above. For example, the comparison and determination unit 1163 can output information indicating the range in which the value representing the relative thickness reduction amount is equal to or larger than a predetermined threshold, together with the determined result.

The camera 120 captures images of the conveyor belt 200 that is the inspection object, from above the conveyor belt 200 at a predetermined frame rate. As described above, the camera 120 is installed above the conveyor belt 200 in advance in a state of being oriented downward so that the installation height becomes about 1.5 m. Specifically, for example, the camera 120 is installed so as to be able to capture the conveyor belt 200 moving at a constant velocity from immediately above. It is assumed that the installation height of the camera 120 and the capturing direction are not changed during capturing of the conveyor belt 200.

Capturing images by the camera 120 is performed during a time period from the time when the conveyor belt 200 that moves at a constant velocity started to move until it is driven for one revolution. As the camera 120, a charge-coupled device (CCD) camera, a complementary MOS (CMOS) camera, or the like can be used.

An exemplary configuration of the conveyor belt inspection system 100 is as described above. Next, an exemplary operation of the conveyor belt inspection device 110 will be described with reference to FIG. 8.

Referring to FIG. 8, the conveyor belt 200 is started to move at a constant velocity, according to the operation by an operator or the like (step S101). In the present embodiment, the moving velocity of the conveyor belt 200 is not necessarily known if the moving velocity is constant.

The conveyor belt inspection device 110 repeats the processing of steps S103 and S104 until the conveyor belt 200 performing conveyance is driven for at least one revolution (steps S102, S105).

The image acquisition unit 1161 acquires image data from the camera 120 by transmitting commands via the camera I/F unit 111 or the like (step S103). Then, the image acquisition unit 1161 stores the acquired image data in the storage unit 115 as the image data 1151 (step S104). For example, the image acquisition unit 1161 repeats the processing described above until the conveyor belt 200 is driven for one revolution at a constant velocity. Thereby, the image acquisition unit 1161 acquires image data for one loop of the conveyor belt 200.

The apparent velocity calculation unit 1162 reads the image data 1151 from the storage unit 115. For example, the apparent velocity calculation unit 1162 acquires image data units of the successive acquisition clock times (successive image IDs) among the image data units recorded as the image data 1151. Then, the apparent velocity calculation unit 1162 extracts feature amounts from the acquired image data units, to thereby extract the same extraction points such as flaws, patterns, and dirt. Then, the apparent velocity calculation unit 1162 compares the extracted extraction points to thereby determine how many pixels the same extraction points such as flaws, patterns, or dirt have moved between the acquired image data units. This means that the apparent velocity calculation unit 1162 determines the apparent moving amount of the extraction points between the image data units. Thereafter, the determined number of pixels is divided by the time period between the image data units. For example, by such a method, the apparent velocity calculation unit 1162 calculates the apparent velocity representing the amount of change in the number of pixels per unit time (step S106). Thereafter, the apparent velocity calculation unit 1162 stores the calculated apparent velocity in the storage unit 115 as the apparent velocity information 1152. The apparent velocity calculation unit 1162 may calculate the apparent velocity with sub-pixel precision in a predetermined small region unit by using a digital image correlation method, a phase limitation correlation method, an optical flow, or the like, for example.

Note that the processing at step S106 may be started at the point of time when at least two image data units of the consecutive acquisition clock times are stored in the storage unit 115. That is, the apparent velocity calculation unit 1162 may start calculation processing for the apparent velocity before driving of the conveyor belt 200 for one revolution is completed.

The comparison and determination unit 1163 checks, on the basis of the apparent velocity information 1152, whether or not a plurality of apparent velocities included in the apparent velocity information 1152 satisfy a predetermined condition set in advance, and determines the condition of the conveyor belt 200 (step S107). For example, the comparison and determination unit 1163 extracts the highest apparent velocity and the lowest apparent velocity from among the apparent velocities included in the apparent velocity information 1152, and obtains the difference between the highest apparent velocity and the lowest apparent velocity. Thereby, the comparison and determination unit 1163 acquires a value representing the relative thickness reduction amount (see FIG. 7). Then, the comparison and determination unit 1163 determines whether the value representing the relative thickness reduction amount is equal to or larger than a predetermined threshold.

When the value representing the relative thickness reduction amount is equal to or larger than the predetermined threshold (step S107, YES), the comparison and determination unit 1163 determines that the conveyor belt 200 is abraded (step S108). Then, the comparison and determination unit 1163 outputs the determination result indicating that the conveyor belt 200 is abraded, to the screen display unit 114, an external device connected via the communication I/F unit 112, or the like (step S110). Moreover, the comparison and determination unit 1163 stores the determined result in the storage unit 115 as the determination result 1153. Meanwhile, when the value representing the relative thickness reduction amount is smaller than the predetermined threshold (step S107, NO), the comparison and determination unit 1163 determines that there is no problem (step S109). Then, the comparison and determination unit 1163 outputs the determination result indicating that there is no problem, to the screen display unit 114, an external device connected via the communication I/F unit 112, or the like (step S110). Moreover, the comparison and determination unit 1163 stores the determined result in the storage unit 115 as the determination result 1153.

An exemplary operation of the conveyor belt inspection device 110 is as described above.

As described above, the conveyor belt inspection device 110 includes the image acquisition unit 1161, the apparent velocity calculation unit 1162, and the comparison and determination unit 1163. With this configuration, the apparent velocity calculation unit 1162 of the conveyor belt inspection device 110 can calculate the apparent velocity that is apparent moving velocity of the conveyor belt 200 on the basis of the image data acquired by the image acquisition unit 1161. Further, the comparison and determination unit 1163 can determine the condition of the conveyor belt 200 on the basis of the apparent velocity calculated by the apparent velocity calculation unit 1162. That is, according to the conveyor belt inspection device 110 described in the present embodiment, it is possible to perform inspection of the conveyor belt 200 without using an expensive sensor. In other words, by using the conveyor belt inspection device 110 described in the present embodiment, it is possible to suppress the cost of inspecting the inspection object.

Moreover, according to the conveyor belt inspection device 110 described in the present embodiment, it is not necessary to set the installation height strictly. Therefore, by using the conveyor belt inspection device 110, it is possible to easily inspect the conveyor belt 200 that is an inspection object, without a need of installing the camera 120 strictly.

Note that when deflection or the like is caused in the conveyor belt 200, there is a possibility that the installation height is changed due to the deflection in the capturing region. In order to cope with such a possibility, for example, as illustrated in FIG. 9, the capturing region is divided into two regions, and the apparent velocity calculation unit 1162 may be configured to calculate the apparent velocity of extraction points in the respective regions. In that case, the apparent velocity calculation unit 1162 may be configured to determine the apparent velocity of the extraction point by calculating the average of the apparent velocities in the two regions, for example. In this way, the apparent velocity calculation unit 1162 may be configured to calculate the apparent velocity by using a plurality of capturing regions obtained by dividing the capturing region.

Further, in the present embodiment, it has been described that the conveyor belt inspection system 100 is configured of the conveyor belt inspection device 110 and the camera 120. However, the conveyor belt inspection system 100 may be configured of a camera having a function as the conveyor belt inspection device 110, for example. In other words, it is possible to realize the conveyor belt inspection method described in the present embodiment by a camera (inspection device) having the function held by the conveyor belt inspection device 110.

Further, in the present embodiment, it has been described that there is no need to strictly install the conveyor belt inspection device 110 and there is no need to know the moving velocity of the conveyor belt 200. However, as illustrated in FIG. 10, the conveyor belt inspection device 110 may be strictly installed and the moving velocity of the conveyor belt 200 has been known accurately. This means that the conveyor belt inspection system 100 may be configured to capture images of the conveyor belt 200 controlled to move at a predetermined velocity, from a predetermined height. With such a configuration, since the installation height and the moving velocity of the conveyor belt 200 are known, it is possible to calculate a logical value of the apparent velocity that must be observed when an image of the conveyor belt 200 with no abrasion is captured, as illustrated in FIG. 11. As a result, the comparison and determination unit 1163 can determine the absolute thickness reduction amount from the difference between the logical value in a condition with no abrasion in the conveyor belt 200 and the actually observed apparent velocity, for example. Further, the comparison and determination unit 1163 can determine the condition of the conveyor belt 200 on the basis of the absolute thickness reduction amount. That is, by using strict values as described above, the comparison and determination unit 1163 can perform determination on the basis of the absolute thickness reduction amount and predetermined thresholds.

Further, in the present embodiment, it has been described that the conveyor belt inspection device 110 determines the condition of the conveyor belt 200 on the basis of the apparent velocity. However, the conveyor belt inspection device 110 may be configured to determine the condition of the conveyor belt 200 to be inspected on the basis of the apparent moving amount. In the case of determining the condition of the conveyor belt 200 on the basis of the apparent moving amount, for example, the conveyor belt inspection device 110 can be configured to determine that the thickness is reduced (conveyor belt is deteriorated) when the apparent moving amount is different. For example, the conveyor belt inspection device 110 may be configured to determine the condition of the conveyor belt 200 on the basis of the apparent moving amount (on the basis of movement of the conveyor belt 200 to be inspected), without calculating the apparent velocity as described above.

Further, in the present embodiment, the description has been made on the case where the conveyor belt 200 is to be inspected. However, the method described in the present embodiment is also applicable to the case where inspection is performed on those other than the conveyor belt 200.

For example, as illustrated in FIG. 12, a conveyed article 210 placed on the conveyor belt 200 may be an inspection object. For example, in the system illustrated in FIG. 12, a conveyed article inspection device having a function similar to that of the conveyor belt inspection device 110 is connected to the camera 120. Then, the conveyed article inspection device calculates the apparent velocity of the conveyed article 210 and determines the condition of the conveyed article 210. With such a configuration, a conveyed article inspection system that determines the condition of the conveyed article 210 may be configured, for example. Note that the function held by the conveyed article inspection device is similar to that of the conveyor belt inspection device 110. Therefore, the detailed description is omitted. Further, in the case of inspecting the conveyed article 210 placed on the conveyor belt 200, the conveyed article inspection device may be configured such that inspection can be made by comparison with a logical value, as in the case described with use of FIG. 10 and the like. Furthermore, while the conveyed article 210 is assumed to be one having a flat surface like a metallic product such as iron, those other than that may be used.

Further, in the present embodiment, it has been described that the camera 120 is installed immediately above the conveyor belt 200. However, the camera 120 is not necessarily installed immediately above, and may be installed obliquely above the conveyor belt 200 if it can observe changes of the height. Furthermore, as illustrated in FIG. 13, an inspection system not using the conveyor belt 200, such as one that determines the condition of a tire 300 to be inspected by capturing images of the rotating tire 300 from obliquely upward.

For example, the inspection method as described above in the present embodiment is applicable in various manners. the inspection method described in the present embodiment may be performed by combining various applications described above.

Second Exemplary Embodiment

A second exemplary embodiment of the present invention will be described with reference to FIG. 14. In the second exemplary embodiment, a configuration of an inspection device 400 will be described.

Figure 14:
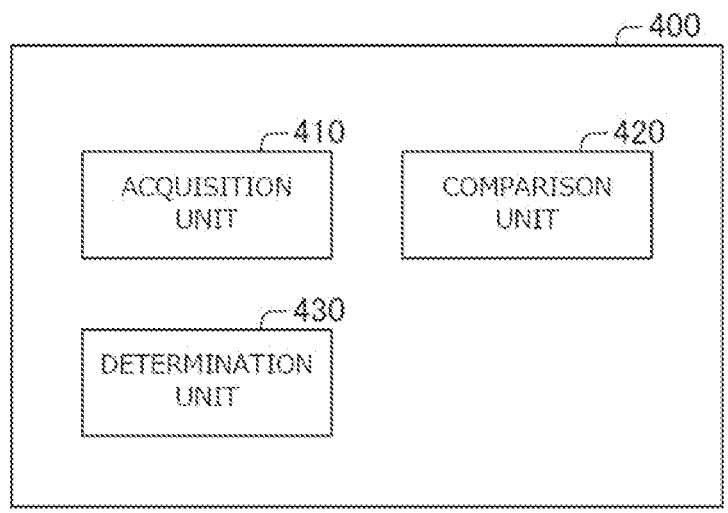
FIG. 14 is a block diagram illustrating an exemplary configuration of an inspection device according to a second exemplary embodiment of the present invention.

FIG. 14 illustrates an exemplary configuration of the inspection device 400. Referring to FIG. 14, the inspection device 400 includes an acquisition unit 410, a comparison unit 420, and a determination unit 430, for example.

For example, the inspection device 400 includes an arithmetic unit such as a central processing unit (CPU) and a storage unit. For example, in the inspection device 400, the arithmetic unit executes a program stored in the storage unit, whereby the various functions described above are implemented.

The acquisition unit 410 acquires a plurality of images of an inspection object, controlled to move at a constant velocity, captured from a given height. For example, the acquisition unit 410 acquires a plurality of images from a camera connected thereto.

The comparison unit 420 compares movements of the inspection object in images on the basis of a plurality of images.

The determination unit 430 determines the condition of the inspection object on the basis of the comparison result.

As described above, the inspection device 400 includes the acquisition unit 410, the comparison unit 420, and the determination unit 430. With this configuration, the comparison unit 420 is able to compare movements of the inspection object in the images acquired by the acquisition unit 410. As a result, the determination unit 430 is able to determine the condition of the inspection object on the basis of the result of comparison by the comparison unit 420. That is, according to the inspection device 400 described in the present embodiment, it is possible to perform inspection of the inspection object without using an expensive sensor. In other words, by using the inspection device 400 described in the present embodiment, it is possible to suppress the cost of inspecting the inspection object.

Further, the inspection device 400 described above can be realized by incorporating a given program, stored on a computer-readable medium, into the inspection device 400. Specifically, a computer-readable medium storing a program, that is another aspect of the present invention, is a computer-readable medium storing a program for implementing, on the inspection device, an acquisition unit 410 that acquires a plurality of images, captured from a given height, of an inspection object controlled to move at a constant velocity, a comparison unit 420 that compares, on the basis of the plurality of images, movements of the inspection object in the images, and a determination unit 430 that determines the condition of the inspection object on the basis of the comparison result.

Further, an inspection method performed by the inspection device 400 described above is a method including, by the inspection device 400, acquiring a plurality of images, captured from a given height, of an inspection object controlled to move at a constant velocity, on the basis of the plurality of images, comparing movements of the inspection object in the images, and determining the condition of the inspection object on the basis of the comparison result.

The invention of a computer-readable medium storing a program or an inspection method, having the above-described configuration, exhibits the same actions and effects as those of the inspection device 400. Therefore, the above-described objection of the present invention can be achieved by such an invention.

<Supplementary Notes>

The whole or part of the exemplary embodiments disclosed above can be described as the following supplementary notes. Hereinafter, the outlines of the inspection device and the like of the present invention will be described. However, the present invention is not limited to the configurations described below.

(Supplementary Note 1)

An inspection device comprising:
  an acquisition unit that acquires a plurality of images of an inspection object controlled to move at a constant velocity, the plurality of images being captured from a given height;
  a comparison unit that compares, on a basis of the plurality of images, movements of the inspection object in the images; and
  a determination unit that determines condition of the inspection object on a basis of a comparison result.

(Supplementary Note 2)

The inspection device according to supplementary note 1, wherein the determination unit determines that the inspection object is deteriorated when moving amounts of the inspection object in the plurality of images are different.

(Supplementary Note 3)

The inspection device according to supplementary note 1, wherein the determination unit compares apparent velocities of the inspection object in the images.

(Supplementary Note 4)

The inspection device according to supplementary note 3, wherein the determination unit determines the condition of the inspection object on a basis of the apparent velocity and a predetermined threshold.

(Supplementary Note 5)

The inspection device according to supplementary note 4, wherein the determination unit determines the condition of the inspection object on a basis of a difference between a highest apparent velocity and a lowest apparent velocity among the apparent velocities, and the threshold.

(Supplementary Note 6)

The inspection device according to any one of supplementary notes 3 to 5, wherein
  the image acquisition unit acquires the plurality of images, captured from a predetermined height, of the inspection object moving at a predetermined velocity, and
  the determination unit determines the condition of the inspection object on a basis of a degree of separation of the apparent velocity from a logical value.

(Supplementary Note 7)

The inspection device according to any one of supplementary notes 3 to 6, wherein the apparent velocity calculation unit calculates the apparent velocity in each of a plurality of divided regions obtained by dividing a capturing region.

(Supplementary Note 8)

The inspection device according to any one of supplementary notes 1 to 7, wherein the inspection object is a conveyor belt.

(Supplementary Note 9)

The inspection device according to any one of supplementary notes 1 to 8, wherein the inspection object is a conveyed article placed on a conveyor belt.

(Supplementary Note 10)

An inspection method comprising, by an inspection device:
  acquiring a plurality of images of an inspection object controlled to move at a constant velocity, the plurality of images being captured from a given height;
  on a basis of the plurality of images, comparing movements of the inspection object in the images; and
  determining condition of the inspection object on a basis of a comparison result.

(Supplementary Note 11)

A computer-readable medium storing a program for implementing, on an inspection device:
  an acquisition unit that acquires a plurality of images of an inspection object controlled to move at a constant velocity, the plurality of images being captured from a given height;
  a comparison unit that compares, on a basis of the plurality of images, movements of the inspection object in the images; and
  a determination unit that determines condition of the inspection object on a basis of a comparison result.

It should be noted that the program described in the exemplary embodiment and the supplementary notes may be stored in a storage device or stored on a storage medium readable by a computer (information processing device). The storage medium is a portable medium such as a flexible disk, an optical disk, a magneto-optical disk, or a semiconductor memory, for example.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST 100 conveyor belt inspection system
110 conveyor belt inspection device
111 camera I/F unit
112 communication I/F unit
113 operation input unit
114 screen display unit
115 storage unit
1151 image data
1152 apparent velocity information
1153 determination result
116 arithmetic processing unit
1161 image acquisition unit
1162 apparent velocity calculation unit
1163 comparison and determination unit
200 conveyor belt 210 conveyed article
300 tire
400 inspection device
410 acquisition unit
420 comparison unit
430 determination unit

What is claimed is:

1. A system comprising:
a conveyor belt that is configured to move at a constant velocity;
a camera installed at a constant installation height above the conveyor belt and in a downwards-oriented direction towards the conveyor belt, the camera configured to capture a plurality of first images of the conveyor belt as the conveyor belt moves;
at least one memory configured to store instructions; and
at least one processor configured to execute instructions to:
acquire, from the plurality of first images, a plurality of second images at successive acquisition clock times;
on a basis of the plurality of second images, compare movement of the conveyor belt in the second images; and
determine a condition of the conveyor belt on a basis of a comparison result, by:
for each of a plurality of pairs of the second images, determining a number of pixels that a region has moved from one image of the pair to the other image of the pair;
for each pair, determining an apparent moving amount according to the number of pixels that the region has moved;
for each pair, calculating an apparent velocity by dividing the determined apparent moving amount by a difference between the acquisition clock times of the pair; and
comparing the plurality of calculated apparent velocities for the plurality of pairs.

2. The system according to claim 1, wherein the at least one processor determines the condition of the conveyor belt on a basis of the plurality of calculated apparent velocities and a predetermined threshold.

3. The system according to claim 2, wherein the at least one processor determines the condition of the conveyor belt on a basis of a difference between a highest apparent velocity and a lowest apparent velocity among the plurality of apparent velocities, and the predetermined threshold.

4. The system according to claim 1, wherein
the at least one processor determines the condition of the conveyor belt on a basis of a degree of separation of the plurality of the apparent velocities from a logical value corresponding to when the conveyor belt is not deteriorated.

5. The system according to claim 1, wherein the at least one processor calculates the apparent velocity in each of a plurality of divided regions obtained by dividing a capturing region of each second image.

6. An inspection method comprising:
installing a camera at a constant installation height above a conveyor belt and in a downwards-oriented direction towards the conveyor belt, the camera configured to capture a plurality of first images of the conveyor belt as the conveyor belt moves;
acquiring, by a processor, from the plurality of first images, a plurality of second images at successive acquisition clock times;
on a basis of the plurality of second images, comparing, by the processor, movement of the conveyor belt in the second images; and
determining, by the processor, a condition of the conveyor belt on a basis of a comparison result, by:
for each of a plurality of pairs of the second images, determining a number of pixels that a region has moved from one image of the pair to the other image of the pair;
for each pair, determining an apparent moving amount according to the number of pixels that the region has moved;
for each pair, calculating an apparent velocity by dividing the determined apparent moving amount by a difference between the acquisition clock times of the pair; and
comparing the plurality of calculated apparent velocities for the plurality of pairs.

7. A non-transitory computer-readable medium storing a program comprising instructions executable by a processor to:
acquire, from a plurality of first images of a conveyor belt captured as the conveyor belt moves and by a camera installed at a constant installation height above the conveyor belt and in a downwards-oriented direction towards the conveyor belt, a plurality of second images at successive acquisition clock times;
on a basis of the plurality of second images, compare movement of the conveyor belt in the second images; and
determine a condition of the conveyor belt on a basis of a comparison result, by:
for each of a plurality of pairs of the second images, determining a number of pixels that a region has moved from one image of the pair to the other image of the pair;
for each pair, determining an apparent moving amount according to the number of pixels that the region has moved;
for each pair, calculating an apparent velocity by dividing the determined apparent moving amount by a difference between the acquisition clock times of the pair; and
comparing the plurality of calculated apparent velocities for the plurality of pairs.

* * * * *